Sept. 22, 1959   D. E. HENDERSON ET AL   2,905,276
HYDRAULIC SCREW BRAKE
Filed Feb. 10, 1958

INVENTORS
DAVID E. HENDERSON
VERNON W. KISER
By
ATTORNEY

2,905,276

HYDRAULIC SCREW BRAKE

David E. Henderson and Vernon W. Kiser, Craig, Colo.

Application February 10, 1958, Serial No. 714,090

1 Claim. (Cl. 188—90)

This invention relates to energy dissipating devices of the type which use a fluid to brake mechanical movement, and more particularly fluid brakes which are adapted to impose a braking torque to a rotating shaft to retard the speed of rotation of a shaft. As such, the invention will be hereinafter referred to as a fluid brake.

A primary object of the invention is to provide a novel and improved fluid brake which is adapted to be mounted upon a rotating shaft to restrict and control the speed of shaft rotation and is especially adapted to be mounted upon and in conjunction with the drive shaft of an automobile or truck to provide a retarding device for use on relatively long downgrades, where the weight of the vehicle is too great, or the grade too steep, to permit the vehicle to be held from excessive speed by the motor alone, to reduce wear and over-heating of the regular friction braking equipment of the vehicle.

Other objects of the invention are to provide a novel and improved fluid brake for a rotating shaft, such as a drive shaft, which: will impose a braking torque on the shaft proportional to the speed of shaft rotation but may be regulated by restricting fluid movement to control or eliminate the braking action; is effectively cooled by fluid circulation to and from a reservoir associated with the brake; includes a symmetrical, operationally balanced arrangement of all elements within the brake so as to eliminate axial thrust and axial, radial or torque vibration upon the shaft; is especially adapted to be quickly and easily installed upon the propeller or drive shaft of a conventional automobile or truck; which will be a low-cost, neat-appearing, easily maintained, rugged and durable unit; and in which the fluid will be propelled away from the shaft seals so as to minimize sealing difficulties.

With the foregoing and other objects in view, all of which will more fully hereinafter appear, the invention comprises certain novel and improved constructions, combinations and arrangements of parts and elements as hereinafter described and defined in the appended claim and illustrated in preferred embodiment in the accompanying drawing in which:

Figure 1:
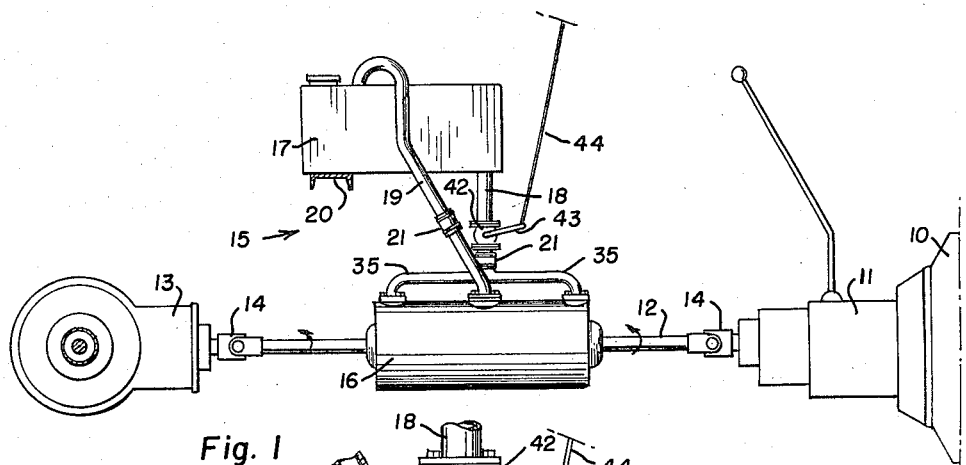
Fig. 1 is a longitudinally oriented elevational view, diagrammatic in nature, of an assemblage constituting the invention mounted upon and operatively associated with the drive shaft of a conventionally arranged automobile drive assembly.

Fluid brakes to retard the rotation of a drive shaft or the like have usually operated upon the principle of churning a body of fluid with a circumferential array of paddles or vanes, or upon the principle of circulating the fluid from a high pressure region to a low pressure region by a pump. Theoretically, it would seem that the dissipation of energy by use of a fluid to brake mechanical movement would be ideal, because parts would not wear out and the fluid could be circulated in such a manner as to permit effective cooling. A perfect fluid brake is found in the ordinary dashpot.

However, where it is necessary to brake the rotation of an automobile drive shaft, or the shaft of a heavily loaded truck, moving down a long grade, the problem becomes complicated by space considerations, and the fact that centrifugal-type churning devices and pumps using vanes will impose axial thrust upon the shaft and the vane arrangements will cause undesirable torque vibration which can become severe. Cavitation can also become a serious problem, especially where the dissipator relies upon abrupt pressure changes. There is a real and definite need for a compact, easily installed shaft brake which is adapted to be mounted upon the drive shaft or propeller shaft of an automobile, which operates quietly and in a balanced manner without torque vibration or unbalanced axial forces.

With such in view, the present invention was conceived and developed, and comprises, in essence, an improved simplified fluid brake having the braking elements encased within a cylindrical shell that is adapted to be mounted upon an automobile drive shaft in simple manner.

Referring more particularly to the drawing, a conventional drive for an automobile or truck will include an engine 10, a portion of which is shown, a gearshift control 11 associated with the engine, a drive shaft 12 extending from the gearshift control 11, and a drive wheel differential gear assembly 13 connected with the drive shaft 12. In the ordinary arrangement the engine and gearshift control are mounted upon the automobile frame near the front of the vehicle, while the differential gear assembly 13 includes an axle housing which is spring-mounted to the automobile frame near the rear of the vehicle. The drive shaft 12 is connected with appropriate shaft stubs at the gearshift 11 and at the differential gear assembly 13 by universal joints 14 in order to compensate for inevitable misalignment between the gearshift control and differential.

The improved brake 15 is adapted to be mounted upon the drive shaft 12 because this shaft may be easily removed for installation of the brake and then replaced by simple disconnection and connection of the universal joints 14. The brake 15 consists of a cylindrical case 16 housing churning elements, hereinafter described, and a fluid reservoir 17 which is interconnected to the case 16 by an intake line 18 and discharge line 19 to effect circulation of fluid as hereinafter described. The case 16 is mounted upon the drive shaft 12, with the drive shaft extending axially therethrough. The reservoir 17 is rigidly mounted upon a suitable vehicle frame member 20, preferably, but not necessarily, immediately above the case 16.

The case 16 is restrained from rotating in accompaniment with the rotation of the shaft 12, by the intake and discharge lines 18 and 19 which secure the case to the fixed reservoir. However, in order to permit the drive shaft 12 and the case 16 thereon to shift and change position responsive to interrelative operational changes of position between the motor 10 and the differential gear assembly 13, the intake and discharge lines 18 and 19 include flexible sections 21 which allow for a necessary amount of play between the case 16 and the reservoir 17.

The cylindrical case 16 is closed at each end by a cylinder head 22 having a threaded peripheral flanged portion 23 that is threaded into a threaded socket portion 24 at each end of the case and against an O-ring seal 25 that it carried in a suitable grooved abutment 26 in the case 16. Each head 22 is formed with a central shaft opening 27 through which the drive shaft 12 extends, and with a stepped bearing socket 28 concentric with the shaft opening 27 and provided with a bearing 29 and oil seal 30 to rotatably hold the shaft 12 and seal the interior of the case. A spider 31 is located at the middle of the case 16 and a bearing 29 is carried by this spider in axial alignment with the bearings 29 to further secure and hold the drive shaft 12.

Figure 2:
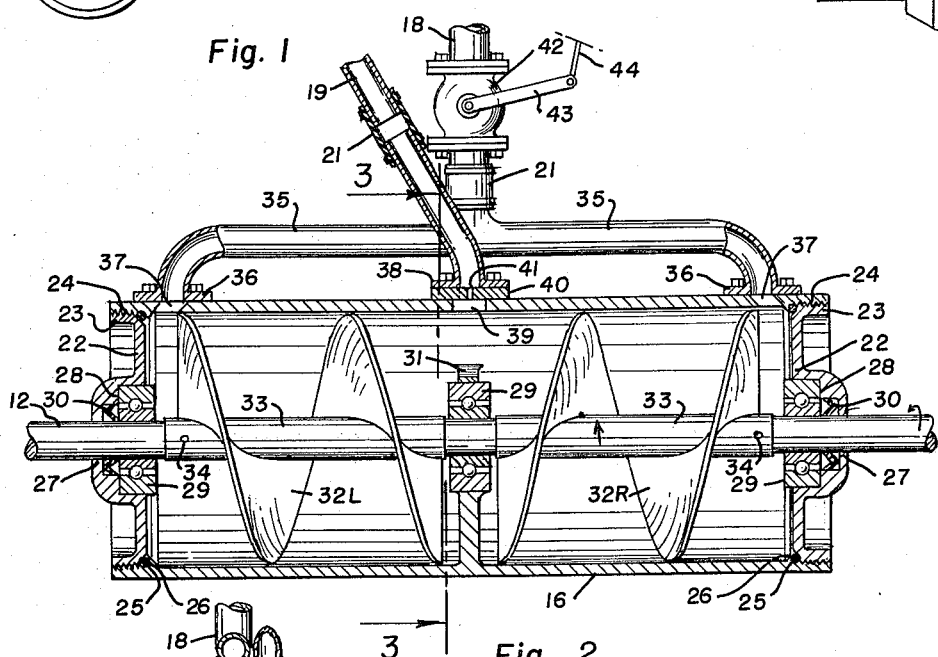
Fig. 2 is a longitudinally oriented sectional view of that portion of the braking assemblage mounted upon the drive shaft, as illustrated in Fig. 1 but on an enlarged scale.
Figure 3:
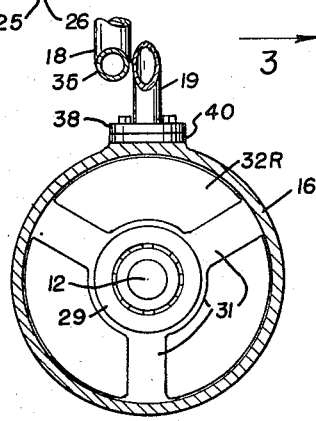
Fig. 3 is a transverse section as viewed from the indicated line 3—3 in Fig. 2.

The shaft rotation is ordinarily in a given direction whenever the fluid retarding brake is being used and with such direction of rotation established, for example, as by the indicated arrows in Figs. 1 and 2, the fluid shifting means within the case 16 may be properly oriented. These means consist of a left-right pair of spiral flights 32L and 32R, each of which is mounted upon the drive shaft 12 at one side of the central spider 31 in virtual opposition with the other whereby proper rotation of the shaft 12 moves fluid in the case 16 from each end toward the center thereof so as to reduce the fluid pressure at the extremities of the case to reduce the possibility of leakage at the shaft openings therein. It is contemplated that this case 16 be symmetrical about the center at the spider 31 with the flights 32L and 32R in symmetrical arrangement in order to balance and thereby eliminate axial thrust and vibration on the shaft 12.

The flights 32L and 32R may be mounted upon the shaft 12 in any suitable manner, and a simple manner, as illustrated, is to form each flight upon a suitable tube 33 which snugly fits over the shaft 12 and is secured thereto as by pins 34, thereby facilitating the assembly of the unit upon the shaft 12.

To effectuate circulation of fluid from the cylinder to the reservoir, the intake line 18 bifurcates to provide a lead 35 to each end of the case 16, where it is suitably turned to terminate as a flanged end 36 which is bolted to the case over an opening 37. The discharge line 19 is formed with a flanged end 38 which is bolted over a central opening 39 in the case 16. However, a washer 40 is interposed between the flange 38 and the opening 39, and this washer 40 includes a restricted control orifice 41 which functions to establish a selected back pressure within the case. It is contemplated that the orifice 41 may be of any selected size, depending upon the type and weight of the vehicle with which the fluid brake is being used.

Operation of the unit is simple, since the rotation of the drive shaft 12 effects a circulation of fluid to and from the reservoir with considerable churning within the case 16, with pressure build-up at the orifice 41 and a consequent dissipation of energy. A shut-off valve 42 is positioned in the intake line 18 which is adapted to be manually operated, as by a lever 43 and control rod 44, and the function of this valve 42 is to cut off flow of fluid into the case 16 when the brake is not needed. With the intake of fluid eliminated, the rotating flights 32L and 32R quickly drain all fluid from the case and through the discharge line to the reservoir, so the flights will churn only air and fluid vapor. Partial opening of the valve 42 will permit fluid to enter the case 16 at a restricted rate and with consequent reduced pressures and churning, and thereby permit adjustable regulation of the braking force imposed to the drive shaft 12.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A retarding brake for the drive shaft of an automotive vehicle comprising: a cylindrical case; an internal bearing support in said case midway the length thereof; a center bearing carried by said support axially of said case, said drive shaft extending axially of said case and being journalled in said center bearing; a tube fixed on said shaft at each side of said center bearing; a right hand spiral flight affixed to one tube; a left hand spiral flight affixed to the other tube, said flights having a diameter substantially conforming to the inner diameter of said case; a cylinder head closing each extremity of said case; an end bearing in each cylinder head journalling said shaft therein; an intake conduit extending longitudinally and exteriorly of said case and communicating with each extremity thereof; a fluid reservoir; an intake line communicating between said reservoir and the middle of said conduit; a flow control valve in said intake line; a discharge line communicating between said reservoir and the middle of said case; and an orifice washer interposed between said case and said discharge line, said orifice washer having an orifice of less area than the internal area of said discharge line, so that when fluid is admitted to the extremities of said case, it will be forced from both extremities to the middle by the rotation of said opposed flights to build up a fluid pressure at the middle due to the restricted discharge allowed by said orifice.

References Cited in the file of this patent

UNITED STATES PATENTS

| | | |
|---|---|---|
| 712,048 | Margoni et al. | Oct. 28, 1902 |
| 1,079,626 | Adams et al. | Nov. 25, 1913 |
| 2,225,079 | Neal | Dec. 17, 1940 |
| 2,232,252 | Mathey | Feb. 18, 1941 |

FOREIGN PATENTS

| | | |
|---|---|---|
| 380,664 | Germany | Sept. 8, 1923 |